(12) United States Patent
Usui

(10) Patent No.: US 10,572,015 B2
(45) Date of Patent: Feb. 25, 2020

(54) VIBRATING DEVICE AND TACTILE SENSE PRESENTING DEVICE

(71) Applicant: Murata Manufacturing Co., Ltd., Nagaokakyo-shi, Kyoto-fu (JP)

(72) Inventor: Kentaro Usui, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 284 days.

(21) Appl. No.: 15/471,439

(22) Filed: Mar. 28, 2017

(65) Prior Publication Data

US 2017/0199574 A1 Jul. 13, 2017

Related U.S. Application Data

(63) Continuation of application No. PCT/US2015/079117, filed on Oct. 15, 2015.

(30) Foreign Application Priority Data

Oct. 24, 2014 (JP) ................................ 2014-216824

(51) Int. Cl.
*G06F 3/041* (2006.01)
*G06F 3/01* (2006.01)

(52) U.S. Cl.
CPC .................................. *G06F 3/016* (2013.01)

(58) Field of Classification Search
CPC ........... G06F 3/016; G06F 2203/04103; G06F 2203/014
See application file for complete search history.

(56) References Cited

U.S. PATENT DOCUMENTS

| 9,332,353 | B2 | 5/2016 | Ando |
| 9,363,607 | B2 | 6/2016 | Ando |
| 2009/0015108 | A1* | 1/2009 | Ishimasa ................ H04R 17/00 310/353 |
| 2014/0079255 | A1 | 3/2014 | Ando |
| 2014/0177143 | A1 | 6/2014 | Takahashi et al. |
| 2015/0086046 | A1* | 3/2015 | Oh ........................ H04R 17/00 381/151 |
| 2015/0131822 | A1 | 5/2015 | Ando |
| 2015/0131823 | A1 | 5/2015 | Ando |

FOREIGN PATENT DOCUMENTS

| JP | 2004-273946 A | 9/2004 |
| JP | 2005-303937 A | 10/2005 |
| JP | 2014-123066 A | 7/2014 |
| WO | WO 2012/157691 A1 | 11/2012 |
| WO | WO 2014/092037 A1 | 6/2014 |

OTHER PUBLICATIONS

International Search Report issued in International Application No. PCT/JP2015/079117, dated Dec. 25, 2015.
Written Opinion of the International Searching Authority issued in International Application No. PCT/JP2015/079117, dated Dec. 25, 2015.

* cited by examiner

*Primary Examiner* — Adam R. Giesy
(74) *Attorney, Agent, or Firm* — Arent Fox LLP

(57) ABSTRACT

A tactile sense presenting device that includes ribs near an adhesion region of a piezoelectric film and a vibrating member. The ribs prevent the adhesive from leaking and controls a leakage amount of the adhesive into a space between the piezoelectric film and the vibrating member.

15 Claims, 7 Drawing Sheets

WIDTH DIRECTION
LENGTH DIRECTION

WIDTH DIRECTION

WIDTH DIRECTION

VIBRATING DEVICE AND TACTILE SENSE PRESENTING DEVICE

CROSS REFERENCE TO RELATED APPLICATIONS

The present application is a continuation of International application No. PCT/JP2015/079117, filed Oct. 15, 2015, which claims priority to Japanese Patent Application No. 2014-216824, filed Oct. 24, 2014, the entire contents of each of which are incorporated herein by reference.

FIELD OF THE INVENTION

The present invention relates to a vibrating device which transmits vibrations.

BACKGROUND OF THE INVENTION

In recent years, tactile sense presenting devices have been proposed as examples of vibrating devices which each feedback a sense of touch by transmitting vibrations when a user touches a key on a touch panel keyboard, and makes the user feel that the user has "pushed" a key.

For example, Patent Literature 1 discloses a structure which holds both ends of a piezoelectric bimorph element made of piezoelectric ceramics or the like by using low elastic bodies, and connects a vibration member to a center of the piezoelectric bimorph element. The structure according to Patent Literature 1 transmits vibrations to a user via the connected vibration member by inputting an alternating-current signal to the piezoelectric bimorph element to cause vibrations.

However, there is a problem that piezoelectric ceramics are likely to be cracked. Meanwhile, a member which is not likely to be cracked such as a piezoelectric film has low capability to transmit vibrations, and is difficult to use for a tactile sense presenting device.

Hence, for example, a structure which connects an end of a diaphragm of a thin flat shape to a piezoelectric film and applies a stress to the diaphragm may be adopted. In this case, the diaphragm vibrates in a direction orthogonal to a principal surface when the piezoelectric film stretches or contracts. A stress is applied to the diaphragm and, consequently, can be efficiently vibrated in response to the stretching or the contraction of the piezoelectric film. Further, by adjusting a frequency at which the piezoelectric film stretches or contracts, to a resonant frequency of the entire structure including the diaphragm and the film, it is possible to more efficiently cause vibrations.

Furthermore, for example, a structure which connects a piezoelectric film to a frame body composed of a member of a prism shape may be also adopted. In this case, prism members facing each other are connected by the piezoelectric film, and the piezoelectric film is disposed in an opening of the frame body. In this case, the piezoelectric film is disposed directly below a touch panel or the like, so that, when a user pushes the touch panel, the touch panel touches the piezoelectric film, and vibrations of the piezoelectric film are directly transmitted to the user. Consequently, it is possible to efficiently transmit the vibrations.

Patent Document 1: Japanese Patent Application Laid-Open No. 2005-303937

SUMMARY OF THE INVENTION

When a diaphragm and a film are adhered, a variation of an adhesion position is a problem. When an adhesion position of the diaphragm and the film varies, vibration characteristics vary per product.

It is therefore an object of the present invention to provide a vibrating device which prevents variations of adhesion positions of a diaphragm and a film.

A vibrating device according to the present invention includes a film which deforms in a planar direction when a voltage is applied thereto; a vibrating member which adhered to an end of the film; and adhesion region control means is provided near an adhesion region of the film and the vibrating member.

Further, in the vibrating device, a driving unit is provided which applies the voltage to the film.

A resonant frequency of the vibrating member changes according to a connection position with the film. However, according to the preferred configuration, the adhesion region control means uniformly determines the adhesion position, so that the resonance frequency does not change and it is possible to appropriately keep vibration characteristics at all times.

The adhesion region control means is composed of, for example, a protrusion, a groove or a water-repellent portion (or an oil-repellent portion) provided to the vibrating member. According to an aspect, the protrusion can be also additionally attached as a rib to a diaphragm or can be also integrally formed with the diaphragm. Particularly when the adhesion region control means is the protrusion, this protrusion serves as the base point for the film to stretch and contract, so that it is possible to appropriately keep vibration characteristics at all times.

In this regard, the adhesion region control means is preferably provided on the entire adhesion region in a width direction. The adhesion region control means is provided in the entire region in the width direction, so that, when adhesion is performed by using an adhesive, a leakage amount of the adhesive is controlled and, consequently, it is possible to prevent the vibration characteristics from varying per product. Further, the adhesion region control means is preferably provided at an end side of the vibrating member.

In this regard, examples of the film which deforms in the planar direction when applied a voltage include a piezoelectric film, an electrostrictive film, an erectret film, a composite film or an electroactive film. Further, according to an aspect, a material (e.g. a piezoelectric film) having piezoelectricity may be attached to a principal surface of a resin film which does not have piezoelectricity, and the resin film may be connected to the diaphragm.

Furthermore, a material of the piezoelectric resin may be not only polyvinylidene fluoride but also polylactic acid.

According to the present invention, it is possible to prevent variations of adhesion positions of a diaphragm and a film.

DETAILED DESCRIPTION OF THE INVENTION

Figure 1:
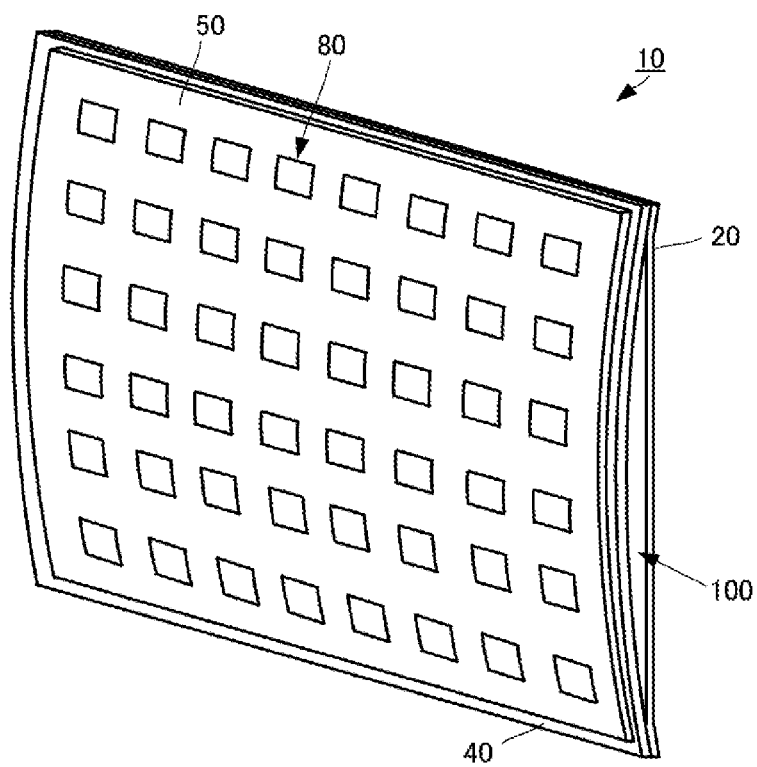
FIG. 1 is an external appearance perspective view of a tactile sense presenting device 10.
Figure 2B:
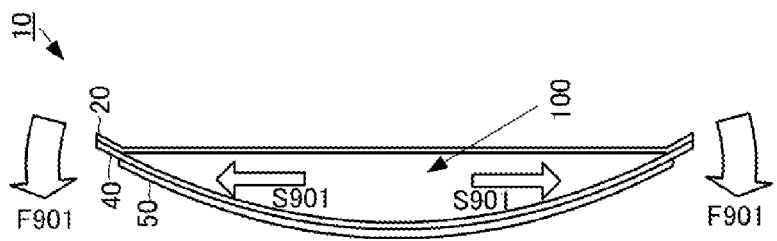
FIG. 2(A) is a front view and FIG. 2(B) is a side view of the tactile sense presenting device 10.
Figure 2A:
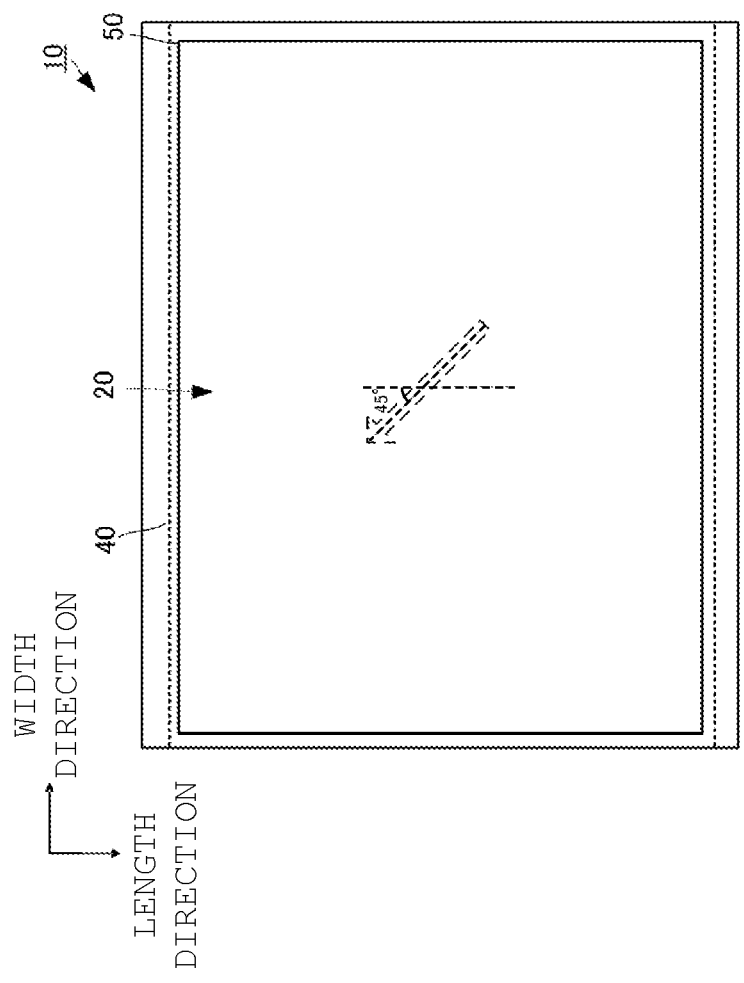

FIG. 1 is an external appearance perspective view of a tactile sense presenting device 10 according to a first embodiment. FIG. 2(A) is a front view of the tactile sense presenting device 10, and FIG. 2(B) is a side view.

The tactile sense presenting device 10 includes a piezoelectric film 20, a diaphragm 40 and a touch panel 50. The tactile sense presenting device 10 is a so-called keyboard, and the touch panel 50 of a flat shape is provided with a plurality of touch sensors 80 at positions meeting key alignment. Each touch sensor 80 corresponds to a touch detecting unit according to the present invention. Each touch sensor 80 may be any type of a touch sensor as long as the touch sensor has a function of detecting a user's touch operation, and, for each touch sensor 80, various types such as a membrane type, a capacitive-type and a piezoelectric film type can be used.

The touch panel 50 is attached to one principal surface (front surface) of the diaphragm 40 of the flat shape. The diaphragm 40 has a rectangular shape when seen from a plan view. Both ends of the diaphragm 40 in a lateral direction on the other principal surface (back surface) are fixed to the piezoelectric film 20. The diaphragm 40 is made of acrylic resin PMMA, for example. In addition, other materials such as a metal plate, PET, polycarbonate (PC), a glass epoxy substrate and glass may be used for the diaphragm 40.

In addition, the touch panel 50 is not indispensable. For example, according to an aspect, a plurality of touch sensors 80 can be provided on the front surface of the diaphragm 40 and at positions meeting key alignment. Further, in this example, the piezoelectric film 20 has a size which substantially overlaps the diaphragm 40 when seen from the plan view. However, according to an aspect, a plurality of piezoelectric films 20 of strip shapes may be disposed at intervals in a length direction.

Figure 3A:
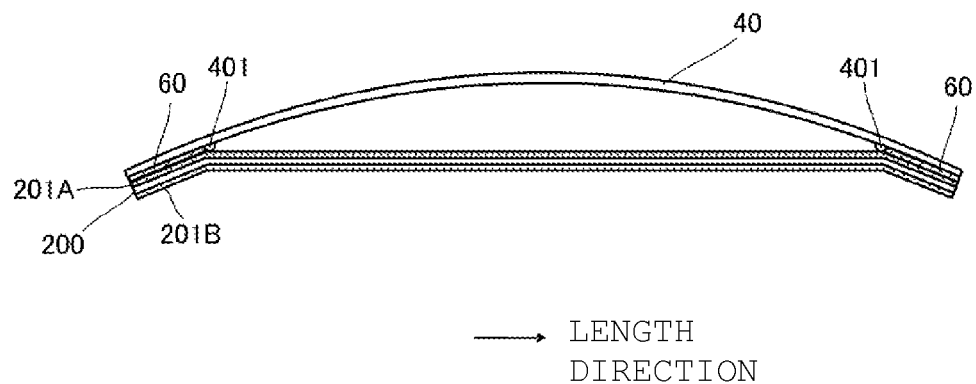
FIG. 3(A) is a side sectional view and FIG. 3(B) is a front view illustrating details of an adhesion portion of a piezoelectric film and a diaphragm.
Figure 3B:
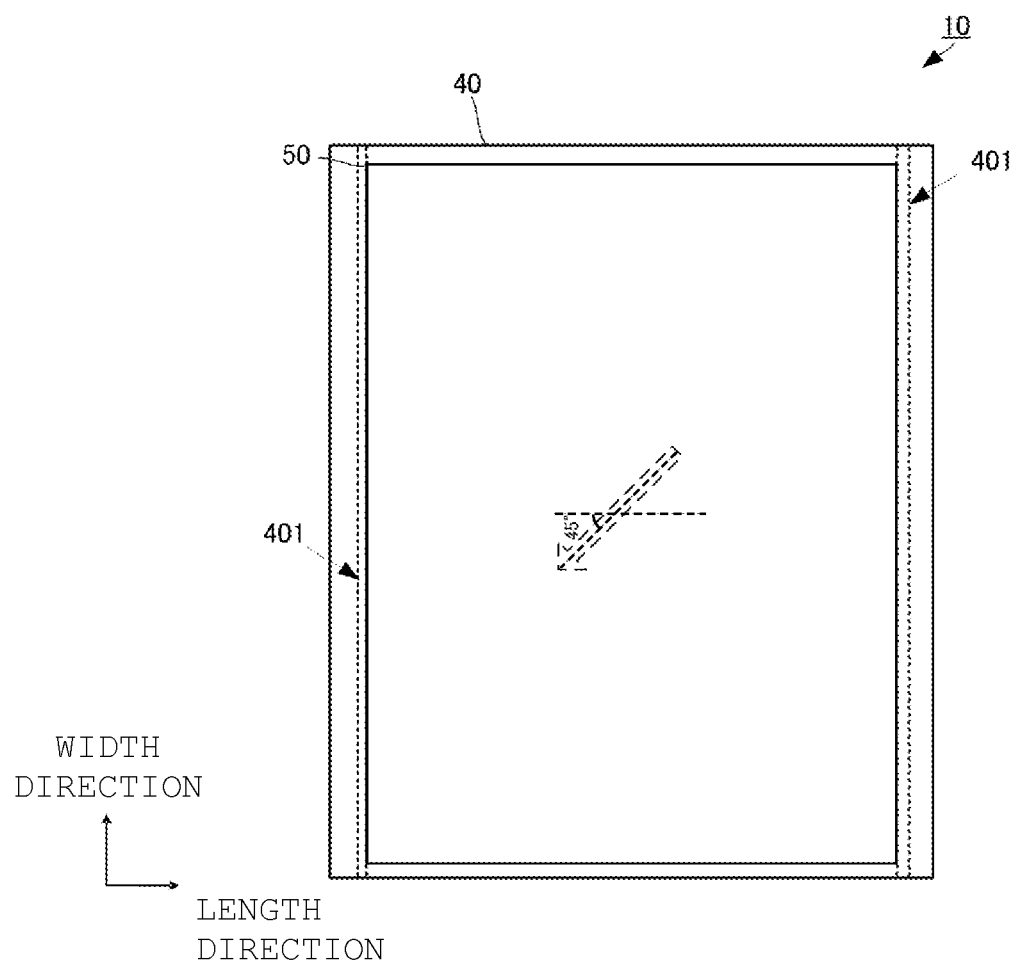

The piezoelectric film 20 has a rectangular shape when seen from the plan view similar to the diaphragm 40. As illustrated in FIGS. 3(A) and 3(B), the piezoelectric film 20 includes a base film 200 of a rectangular shape seen from the plan view, and electrodes 201A and 201B which are formed on both opposing principal surfaces of the base film 200.

The base film 200 is piezoelectric resin whose material is, for example, polyvinylidene fluoride (PVDF) or chiral polymers. The chiral polymer is, for example, poly-L-lactic acid (PLLA).

When the PVDF is used for the piezoelectric film, the PVDF has water resistance, so that it is possible to provide the same click feeling even when electronic devices including a tactile sense presenting device, for example, is under any humidity environment.

Further, when the PLLA is used for the piezoelectric film, the PLLA is a highly permeable material, so that using a transparent material for electrodes and a diaphragm to be added to the PLLA makes an internal status of functional parts visible when the functional parts which vibrate are manufactured and is advantageous in terms of manufacturing. Furthermore, disposing a light emitting source such as a light inside the functional part makes key positions visible at a dark place. Still further, the PLLA does not have pyroelectricity and, consequently, can provide the same click feeling under any temperature environment.

When the base film 200 is made of the PLLA, as illustrated in FIG. 2(A), the base film 200 is formed in a rectangular shape by cutting the base film 200 such that each outer circumference side forms approximately 45° with respect to a stretching direction to provide piezoelectricity. Further, using the PLLA cut in this way makes a 0° direction or a 90° direction substantially parallel to a width direction of the diaphragm 40, so that it is possible to cause the diaphragm to efficiently operate at a low voltage. In this regard, approximately 45° means 45±10°. Although 45° is ideal, as long as the degrees are in range of 45°±10°, it is possible to provide the substantially same characteristics as those provided at 45°.

The electrode 201A and the electrode 201B are formed on almost entire surfaces of the both principal surfaces of the base film 200. The electrode 201A and the electrode 201B are preferably deposited electrodes such as aluminum (Al), copper (Cu) or the like. In this regard, when the electrodes of the piezoelectric film 11 need to have transparency, it is preferable to use electrodes whose main components are indium tin oxide (ITO), zinc oxide (ZnO) and polythiophene, or a silver nanowire electrode material. Further, an electrode material whose component is carbon such as carbon nanotubes or carbon fibers may be used for the electrodes of the piezoelectric film 11. The electrode 201A and the electrode 201B are connected with an extended wiring conductor which is not illustrated, and drive signals are applied to the electrode 201A and the electrode 201B via the wiring conductor.

The diaphragm 40 is fixed and connected to the electrode 201A of the piezoelectric film 20 by an adhesive 60. In this regard, the diaphragm 40 may be connected to a portion of the piezoelectric film 20 at which the electrode 201A is not formed. In this case, the diaphragm 40 is connected to the base film 200 with the adhesion layer 60 interposed therebetween.

Figure 4:
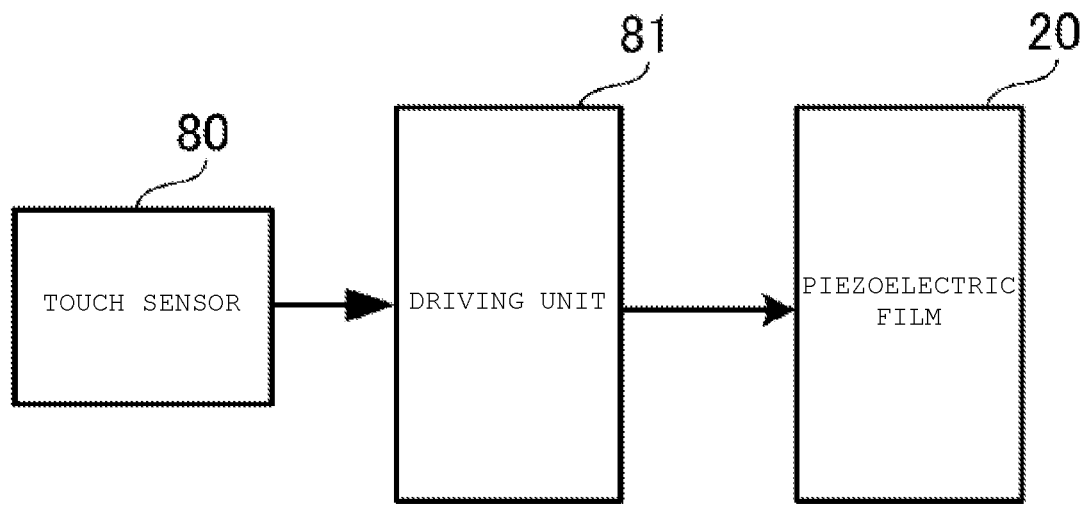
FIG. 4 is a block diagram illustrating a configuration of the tactile sense presenting device 10.

This piezoelectric film 20 deforms in a planar direction when applied a voltage. As illustrated in FIG. 4, when a user touches the touch sensor 80 provided to the touch panel 50, a driving unit 81 applies drive signals to the electrode 201A and the electrode 201B of the piezoelectric film 20. Thus, the piezoelectric film 20 stretches or contracts in the planar direction.

As illustrated in FIG. 1 and FIG. 2(B), the diaphragm 40 is fixed to the piezoelectric film 20 in such a shape that the diaphragm 40 is curved protruding toward a side (a front surface side of the diaphragm 40) opposite to a side (a back surface side of the diaphragm 40) at which the piezoelectric film 20 is provided. According to this configuration, a hollow region 100 is formed between the diaphragm 40 and the piezoelectric film 20. Further, the side at which this diaphragm 40 is provided is the front surface side of the tactile sense presenting device 10, and the side at which the piezoelectric film 20 is provided is the back surface side of the tactile sense presenting device 10.

In this regard, in the present embodiment, a curved state of the diaphragm 40 is described in an exaggerated state for ease of description. In reality, the principal surface of the diaphragm 40 and the principal surface of the piezoelectric film 20 are desirably as parallel as possible, and the hollow region 100 is desirably as small as possible.

Thus, the diaphragm 40 is fixed to the piezoelectric film 20 in a state where the flat surface is curved, and is fixed to the piezoelectric film 20 in a state where a bending stress is applied as indicated by outlined arrows F901 in FIG. 2(B). Further, a tensile force is applied to the piezoelectric film 20 in the lateral direction on the principal surface of the piezoelectric film 20 as indicated by outlined arrows S901 in FIG. 2(B).

Figures 5A, 5B, 5C:
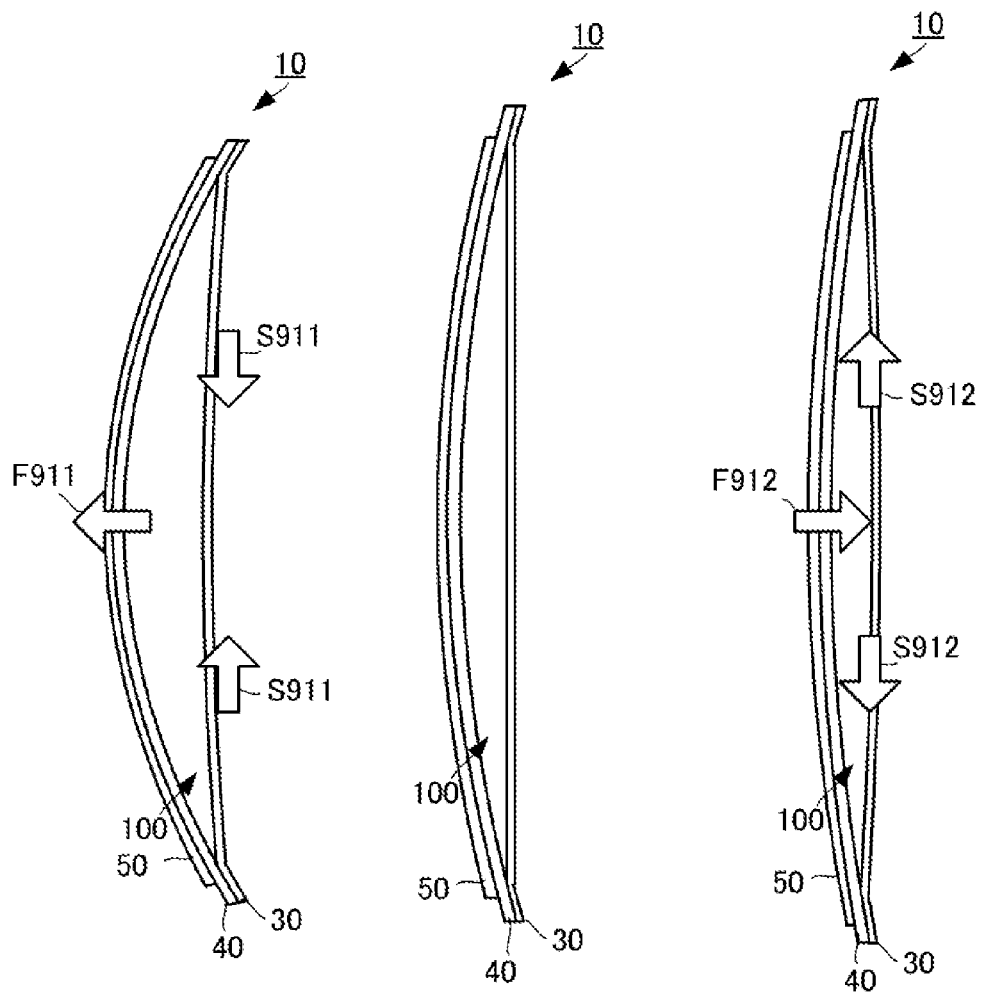
FIGS. 5(A) to 5(C) are explanatory views of an operation of the tactile sense presenting device 10.

FIGS. 5(A) to 5(C) are explanatory views of an operation of the tactile sense presenting device 10, and FIG. 5(A) illustrates a state at a timing at which the piezoelectric film 20 is contracted according to a drive signal. FIG. 5(B) illustrates a state where a drive signal is not applied or an amplitude of the drive signal is 0. FIG. 5(C) illustrates a state at a timing at which the piezoelectric film 20 is stretched according to a drive signal.

When the driving unit 81 applies the drive signal to the piezoelectric film 20 and applies an electric field in a first direction of the piezoelectric film 20, the piezoelectric film 20 contracts along a direction orthogonal to fixed ends of the diaphragm 40 as indicated by arrows S911 in FIG. 5(A). Further, the diaphragm 40 is pulled from portions (ends in the lateral direction) fixed to the piezoelectric film 20 to a center direction. Thus, the diaphragm 40 is curved protruding forward as indicated by an arrow F911 in FIG. 4(A).

Meanwhile, when the driving unit 81 applies the drive signal to the piezoelectric film 20 and applies an electric field in a second direction opposite to the first direction, the piezoelectric film 20 stretches along a direction orthogonal to the fixed ends of the diaphragm 40 as indicated by arrows S912 in FIG. 5(C). Further, the diaphragm 40 is pulled from the center direction to portions (ends in the lateral direction) fixed to the piezoelectric film 20. Thus, the diaphragm 40 is placed in a curved state where a forward protrusion amount lowers as indicated by an arrow F912 in FIG. 5(C).

Hence, the diaphragm 40 transits to a state in FIG. 5(A) or a state in FIG. 5(C) based on a state in FIG. 5(B) according to an amplitude of the drive signal, and vibrates along a front surface direction and a back surface direction (a direction orthogonal to the principal surface of the diaphragm 40). Thus, vibrations corresponding to a drive signal are transmitted to the touch panel 50 via the diaphragm 40, and are transmitted to the user who has touched the touch panel 50. Consequently, when touching the touch sensor 80 of the touch panel 50, the user receives a feedback of vibrations and, consequently, can feel that the user has "pushed" a key.

Further, the diaphragm 40 receives a stationary bending stress in a non-operation state, and therefore a force applied to the diaphragm 40 when the piezoelectric film 20 stretches works in the same direction as that of the bending stress. Consequently, the tactile sense presenting device 10 can efficiently vibrate the diaphragm 40, and transmit vibrations which are strong to some degree even when the piezoelectric film is used. Further, it is possible to make the tactile sense presenting device 10 thin compared to a device which cause vibrations by a motor or the like.

In addition, by filling soft resin such as silicone gel in the hollow region 100, it is desirable to suppress sounds produced by the vibrations of the piezoelectric film 20 and the diaphragm 40.

Further, as illustrated in FIG. 3(A), the tactile sense presenting device 10 includes ribs 401 near an adhesion region of the piezoelectric film 20 and the diaphragm 40. The ribs 401 are protrusions attached to the diaphragm, and are made of, for example, a single-side pressure-sensitive tape, a resist, a resin member or a metal material. Alternatively, according to an aspect, the ribs 401 may be adhesives solidified prior to the adhesive 60.

The ribs 401 are provided to end sides of the diaphragm 40, so that, when the piezoelectric film 20 and the diaphragm 40 are adhered by the adhesive 60, the ribs 401 prevent the adhesive 60 from leaking and control a leakage amount of the adhesive 60. Consequently, it is possible to suppress variations of an adhesive strength. Further, it is possible to prevent vibration characteristics from varying per product.

Figure 8A:
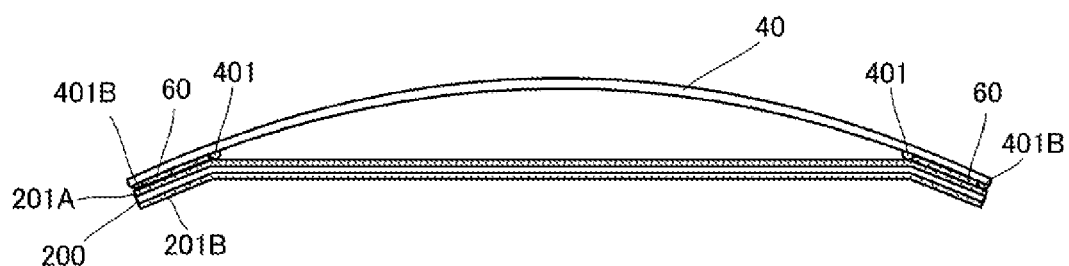
FIGS. 8(A) and 8(B) are side sectional views illustrating an adhesion portion of a piezoelectric film and a diaphragm.
Figure 8B:
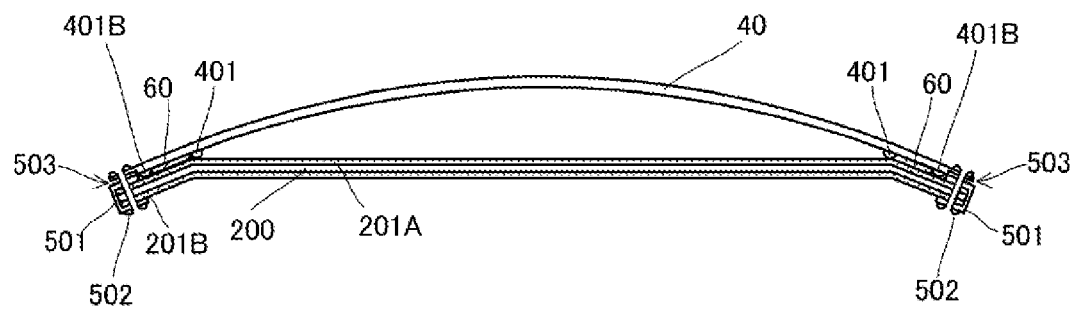

In this regard, in an example illustrated in FIG. 3(A), the ribs (adhesion region control means) 401 are disposed to prevent the adhesive 60 from spreading toward the center (bow-shaped portion) of the diaphragm 40. However, as illustrated in, for example, FIG. 8(A), ribs 401B may be further disposed at end sides of the diaphragm 40. Thus, the adhesive 60 does not leak from the end sides of the diaphragm 40, either. Further, ribs may be provided not only at the diaphragm side but also at the film side. Furthermore, as illustrated in FIG. 8(B), the piezoelectric film 20 may be fixed not only by the adhesive 60 but also by aluminum foils 501 or grommets 502. In this case, ends of the diaphragm 40 in the width direction are scraped thin, and are provided with cutouts 503 to prevent the thickness from increasing. Further, the aluminum foils 501 prevent a mechanical load from being applied to the piezoelectric film 20 when the piezoelectric film 20 is fixed by the grommets 502.

Furthermore, when the ribs 401 are in contact with the piezoelectric film 20, the ribs 401 serve as base points for portions at which the piezoelectric film 20 stretches or contracts. That is, the piezoelectric film 20 between the facing ribs 401 when seen from the plan view stretches or contracts. A resonant frequency of the diaphragm 40 changes according to a connection position connected with the piezoelectric film 20. However, according to this example, positions of the ribs 401 uniformly determine the connection position of the piezoelectric film 20, so that the resonance frequency does not change, and it is possible to appropriately keep vibration characteristics at all times.

In this regard, as illustrated in FIG. 3(B), the ribs 401 are preferably provided over the entire adhesion region of the piezoelectric film 20 in the width direction. The ribs 401 are provided in the entire region in the width direction, so that it is possible to prevent the adhesive 60 from leaking in the entire region in the width direction.

Figure 6A:
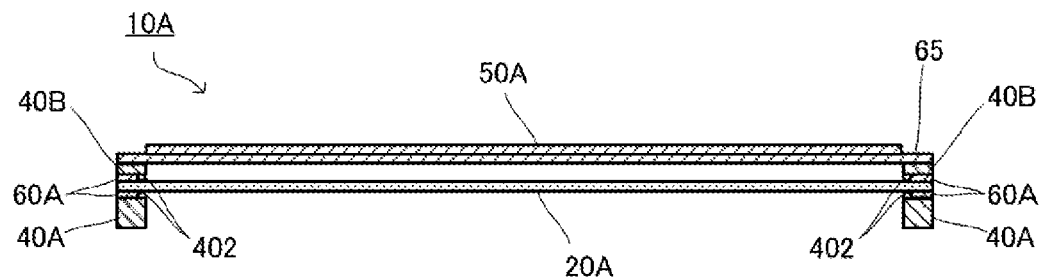
FIGS. 6(A) to 6(C) are side views and a front view of a tactile sense presenting device 10A.
Figure 6B:
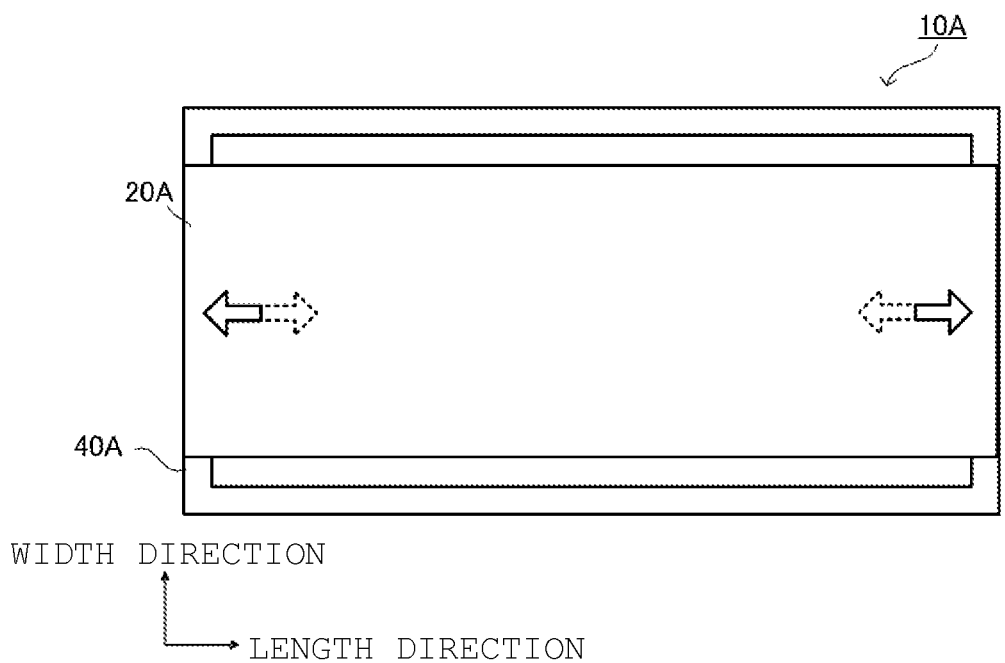

Next, a tactile sense presenting device 10A which is a modified example of a tactile sense presenting device 10 will be described. FIG. 6(A) is a side sectional view of the tactile sense presenting device 10A, and FIG. 6(B) is a plan view of the tactile sense presenting device 10A.

In this example, a vibrating member 40A is formed by a member of a prism shape to form a frame body of a rectangular shape when seen from a plan view. That is, a center portion of the vibrating member 40A is opened when seen from the plan view. The vibrating member 40A is made of a material such as an acrylic resin PMMA, a metal plate, PET, polycarbonate (PC), a glass epoxy substrate and glass.

A piezoelectric film 20A of a rectangular shape seen form the plan view is connected to the vibrating member 40A to cover this opening. The piezoelectric film 20A is adhered on an upper surface of the vibrating member 40A by an adhesive 60A such that prism members facing each other are connected. In this case, a tensile force is applied to the piezoelectric film 20A in a longitudinal direction (length direction).

Further, a frame body 40B having the same shape as that of the vibrating member 40A is connected on the upper surface of the piezoelectric film 20A. The piezoelectric film 20A and the frame body 40B are also adhered by the adhesive 60A. A contact film 65 is connected on the upper surface of the frame body 40B to cover the entire surfaces of the frame body 40B when seen from the plan view. A touch panel 50A is connected on an upper surface of the contact film 65. The contact film 65 is composed of a film material such as a polyester film or a polyurethane film having a high stretching property. Thus, the contact film 65 is supported facing the piezoelectric film 20A with a space interposed therebetween.

Figure 6C:
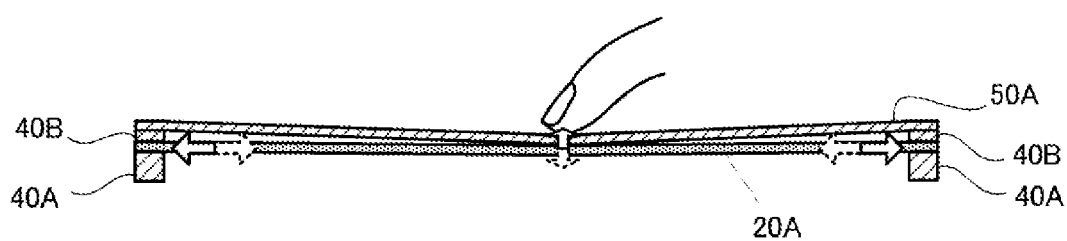

As illustrated in FIG. 6(C), when a user's finger contacts the touch panel 50A, the piezoelectric film 20A of the tactile sense presenting device 10A vibrates. Further, when the user pushes the contact film 65 with the touch panel 50A interposed therebetween, the contact film 65 and the piezoelectric film 20A contact. Thus, vibrations of the piezoelectric film 20A transmit to the user's finger via the contact film 65 and the touch panel 50A. Further, a resistance force of the user's finger for pushing the piezoelectric film 20A via the contact film 65 fluctuates due to a change in a tension of the piezoelectric film 20A. Consequently, it is possible to make the user feel a feedback of a sense of touch.

Further, the tactile sense presenting device 10A includes ribs 402 near an adhesion region of the piezoelectric film 20A and the vibrating member 40A. The ribs 402 are provided to the vibrating member 40A, so that, when the piezoelectric film 20A and the vibrating member 40A are adhered by the adhesive 60A, the ribs 402 prevent the adhesive 60A from leaking and control a leakage amount of the adhesive 60A. Consequently, it is possible to suppress variations of an adhesive strength. Further, it is possible to prevent vibration characteristics from varying per product.

Furthermore, when the ribs 402 are in contact with the piezoelectric film 20A, the ribs 402 serve as base points for portions at which the piezoelectric film 20A stretches or contracts. That is, the piezoelectric film 20A between the facing ribs 402 when seen from the plan view stretches or contracts. Consequently, in this example, too, positions of the ribs 402 uniformly determine the connection position of the piezoelectric film 20A, so that the resonant frequency does not change, and it is possible to appropriately keep vibration characteristics at all times.

Further, in this example, the ribs 402 are provided near the adhesion region of the piezoelectric film 20A and the frame body 40B. Consequently, when the piezoelectric film 20A and the frame body 40B are adhered by the adhesive 60A, the ribs 402 prevent the adhesive 60A from leaking and control a leakage amount of the adhesive 60A.

Figure 7A:
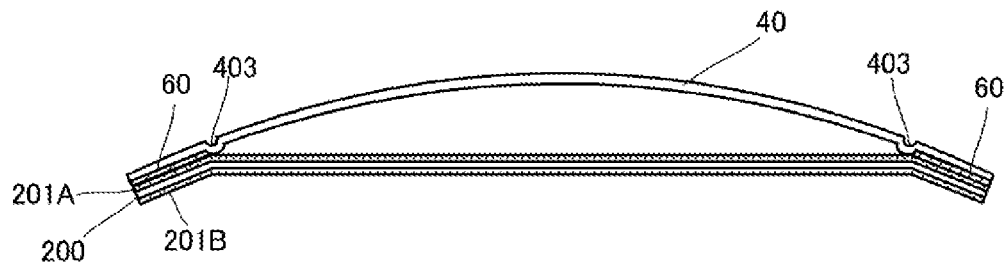
FIGS. 7(A) to 7(D) are views illustrating another embodiment of adhesion region control means.

Next, FIGS. 7(A) to 7(D) are views illustrating another embodiment of adhesion region control means according to the present invention. FIGS. 1 to 6 illustrate ribs 401 (or ribs 402) provided to a diaphragm. However, the adhesion region control means can also be realized by protrusions 403 integrally formed with a diaphragm 40 as illustrated in FIG. 7(A), for example. In this case, the protrusions 403 are formed by molding the diaphragm 40 by press working. In this case, a new member does not need to be provided as the adhesion region control means, so that it is possible to reduce cost, and improve reliability since members are not peeled.

Figure 7B:
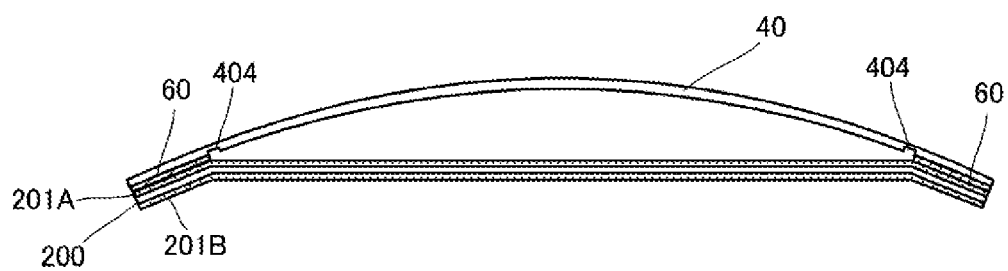

Further, as illustrated in FIG. 7(B), the adhesion region control means can also be realized by grooves 404 provided to the diaphragm 40. The grooves 404 are formed by, for example, etching or machining. Further, the grooves 404 can be formed by preparing a plurality of thin diaphragms and pasting a plurality of diaphragms at portions except positions of the grooves 404. In this case, the leaking adhesive 60 enters the grooves 404, and therefore adhesion positions of the diaphragm 40 and the piezoelectric film 20 do not change.

Figure 7C:
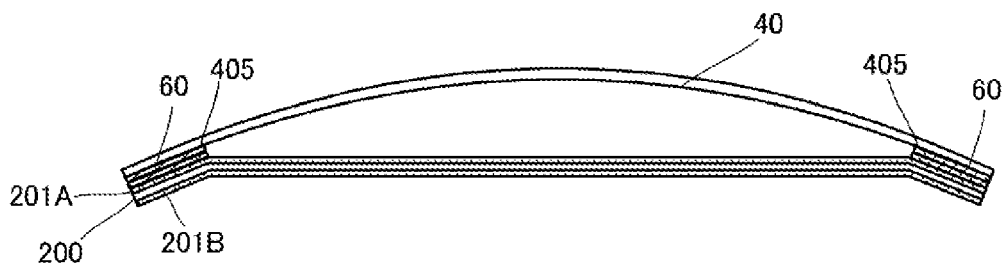

Further, as illustrated in FIG. 7(C), the adhesion region control means can be also realized by providing bases 405 in addition to the diaphragm 40. Similar to the ribs 401, the bases 405 are made of, for example, a single-side pressure-sensitive tape, a resist, a resin member or a metal material. In this case, too, similar to the grooves 404, the leaking adhesive 60 enters side surface sides of the bases 405, and therefore adhesion positions of the diaphragm 40 and the piezoelectric film 20 do not change.

Figure 7D:
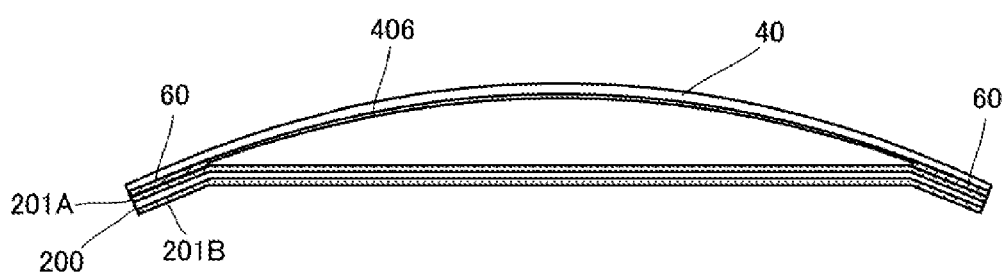

Further, as illustrated in FIG. 7(D), the adhesion region control means can be also realized by providing a water-repellent portion (or an oil-repellent portion) 406 to a portion of the diaphragm 40 to which an adhesive is not applied. The water-repellent portion 406 is formed by coating a coating material such as a fluorine coating or a silicone coating. Further, the water-repellent portion 406 can be realized by baking fluorine. In this regard, the structures illustrated in FIGS. 7(A) to 7(D) may be optionally combined. For example, both of the bases 405 in FIG. 7(C) and the water-repellent portion (or the oil-repellent portion) 406 in FIG. 7(D) may be combined for use.

In addition, in the present embodiment, "the film member which deforms in the planar direction when a voltage is applied thereto" is, for example, a piezoelectric film yet is not limited to a piezoelectric film. Examples of the film member which deforms in the planar direction when a voltage is applied additionally include an electrostrictive film, an erectret film, a composite film or an electroactive film. In this regard, the electroactive film is a film which is electrically driven to produce a stress, or a film which deforms and causes displacement. Specifically, the electroactive film includes an electrostrictive film, a composite material (a material formed by sealing piezoelectric ceramics with resin), an electrically driving elastomer or a liquid crystal elastomer.

Further, an example where a piezoelectric film 20 is directly connected to the diaphragm 40 has been described in the present embodiment. However, according to an aspect, the piezoelectric film 20 may be indirectly connected to the diaphragm 40 with another resin film which does not have piezoelectricity interposed therebetween. According to an aspect, the piezoelectric film 20 may be attached to a principal surface of a resin film, and ends of the resin film may be connected to the diaphragm 40. Naturally, in addition, according to an aspect, a film such as an electrostrictive film, an erectret film, a composite film or an electroactive film may be attached to the principal surface of the resin film, and the ends of the resin film may be connected to the diaphragm 40.

Further, "the film which deforms in the planar direction when a voltage is applied" can be realized by using, for example, piezoelectric ceramics and a resin film. For example, "the film which deforms in the planar direction when a voltage is applied" can be realized by connecting a plurality of resin films with piezoelectric ceramics interposed therebetween, and connecting a plurality of these resin films to the diaphragm 40, respectively.

Further, "the film which deforms in the planar direction when a voltage is applied" may be a single layer or a laminated layer. It is possible to cause stronger vibrations by increasing the number of layers to be laminated in particular. In this regard, in the above example, the tactile sense presenting device has been described as an example of a vibrating device. However, the vibrating device according to the present invention is not necessarily limited to "a sense of touch", and a device such as a speaker which outputs sounds is also an example of the vibrating device.

DESCRIPTION OF REFERENCE SYMBOLS 10, 10A: TACTILE SENSE PRESENTING DEVICE
20, 20A: PIEZOELECTRIC FILM
40: DIAPHRAGM
40A: VIBRATING MEMBER
40B: FRAME BODY
50: TOUCH PANEL
50A: TOUCH PANEL
60, 60A: ADHESIVE
65: CONTACT FILM
80: TOUCH SENSOR
81: DRIVING UNIT
100: HOLLOW REGION
200: BASE FILM
201A, 201B: ELECTRODE
401, 402: RIB
403: PROTRUSION
404: GROOVE
405: WATER-REPELLENT PORTION

The invention claimed is:

1. A vibrating device comprising:
a film which deforms in a planar direction when a voltage is applied thereto;
a vibrating member having an end thereof adhered to the film and arranged so as to define a space between the film and the vibrating member; and
adhesion region control means disposed between the film and the vibrating member to prevent adhesive from spreading into the space between the film and the vibrating member,
wherein the adhesion region control means is a protrusion between the film and the vibrating member.

2. The vibrating device according to claim 1, further comprising a driving unit that applies the voltage to the film.

3. The vibrating device according to claim 1, wherein the protrusion is a rib.

4. The vibrating device according to claim 1, wherein the rib is attached to the vibrating member.

5. The vibrating device according to claim 1, wherein the protrusion is integral with the vibrating member.

6. The vibrating device according to claim 1, wherein the film contains polyvinylidene fluoride.

7. The vibrating device according to claim 1, wherein the film contains polylactic acid.

8. A vibrating device comprising:
a film which deforms in a planar direction when a voltage is applied thereto;
a vibrating member having an end thereof adhered to the film and arranged so as to define a space between the film and the vibrating member; and
adhesion region control means disposed between the film and the vibrating member to prevent adhesive from spreading into the space between the film and the vibrating member,
wherein the adhesion region control means is provided at an end side of the vibrating member, and
wherein the adhesion region control means is a groove in the vibrating member.

9. A vibrating device comprising:
a film which deforms in a planar direction when a voltage is applied thereto;
a vibrating member having an end thereof adhered to the film and arranged so as to define a space between the film and the vibrating member; and
adhesion region control means disposed between the film and the vibrating member to prevent adhesive from spreading into the space between the film and the vibrating member,
wherein the adhesion region control means is one of a water-repellent portion and an oil-repellent portion on the vibrating member.

10. A vibrating device comprising:
a film which deforms in a planar direction when a voltage is applied thereto;
a vibrating member arranged so as to define a first space between the film and the vibrating member;
a protrusion at an end of the vibrating member, the protrusion defining a second space between the film and the vibrating member; and
an adhesive in the second space.

11. The vibrating device according to claim 10, wherein the protrusion is a rib.

12. The vibrating device according to claim 11, wherein the rib is attached to the vibrating member.

13. The vibrating device according to claim 10, wherein the film contains polyvinylidene fluoride.

14. The vibrating device according to claim 10, wherein the film contains polylactic acid.

15. A tactile sense presenting device comprising:
the vibrating device according to claim 1;
a touch detecting unit which detects a touch operation on the tactile sense presenting device; and
a driving unit that applies the voltage to the film when the touch detecting unit detects the touch operation.

* * * * *